(12) United States Patent
Yu

(10) Patent No.: US 7,148,658 B2
(45) Date of Patent: Dec. 12, 2006

(54) PHOTOFLASH CAPACITOR CHARGER AND METHOD THEREOF

(75) Inventor: Donald Cho Lam Yu, Anaheim, CA (US)

(73) Assignee: Yobon Technologies, Inc., Taipei County (TW)

(*) Notice: Subject to any disclaimer, the term of this patent is extended or adjusted under 35 U.S.C. 154(b) by 456 days.

(21) Appl. No.: 10/772,714

(22) Filed: Feb. 5, 2004

(65) Prior Publication Data
US 2005/0174095 A1    Aug. 11, 2005

(51) Int. Cl.
*H02J 7/16* (2006.01)
(52) U.S. Cl. .................. 320/166; 320/320; 320/167
(58) Field of Classification Search ............ 320/166, 320/167, 149, 136, 134
See application file for complete search history.

(56) References Cited

U.S. PATENT DOCUMENTS 6,289,180 B1 * 9/2001 Jeng ........................... 396/206
6,518,733 B1   2/2003 Schenkel et al. ........... 320/166

* cited by examiner

*Primary Examiner*—Karl Easthom
*Assistant Examiner*—Samuel Berhanu
(74) *Attorney, Agent, or Firm*—Thomas, Kayden, Horstemeyer & Risley

(57) ABSTRACT

A method for charge control of a photoflash capacitor. The method includes detecting a voltage on the photoflash capacitor, asserting and then latching a recharge signal when the detected voltage is lower than a first reference voltage, de-asserting and then latching the recharge signal when the detected voltage exceeds a second reference voltage, charging the photoflash capacitor when the recharge signal is asserted, and providing a pin for connection of a resistive element which determines the first reference voltage.

12 Claims, 5 Drawing Sheets

PHOTOFLASH CAPACITOR CHARGER AND METHOD THEREOF

BACKGROUND OF THE INVENTION

1. Field of the Invention

The present invention relates to a photoflash circuit and particularly to a method and device for charging a photoflash capacitor utilizing an adjustable threshold voltage for recharge.

2. Description of the Related Art

Cameras that utilize photoflashes typically include a charging circuit that charges a photoflash capacitor included in the camera. The photoflash capacitor stores energy in the form of electrical charge. This energy is later utilized by the photoflash to produce a "flash" when a picture is taken.

Generally, in a camera with a charging circuit, a battery supplies a current at a certain voltage to a step-up transformer, that is part of the charging circuit. The transformer transforms a voltage of approximately 3 volts (the battery's voltage) to a voltage of 300 volts at which the photoflash capacitor is charged. The photoflash capacitor then provides the energy stored thereon to a trigger circuit that, among other things, contributes to stepping up the voltage on the photoflash (flash tube) to about 4000 volts. This voltage causes ionization of the gas inside the flash tube. When the photoflash is triggered, the discharge of the photoflash capacitor through the ionized flash tube generates a very high current therethrough, which thereby causes light in the flash tube.

FIG. 1 shows a circuit diagram of a photoflash capacitor charging circuit disclosed in U.S. Pat. No. 6,518,733. A power delivery circuitry 120 operates to transfer power from an input source 170 to the photoflash capacitor 144 (which is preferably coupled to the load). The power delivery circuitry 120 includes an adaptive ON-time circuitry 130, adaptive OFF-time circuitry 135, transformer 122, switch transistor 124, latch 126, and output diode 142. The power delivery circuitry 120 is coupled to the photoflash capacitor 144 via the output diode 142. The anode of the output diode 142 is coupled to the output side of the secondary winding of the transformer 122 and the cathode of the output diode 142 is coupled to the photoflash capacitor 144. The input source 170 is coupled to the input of the primary side of the transformer 122. The output of the primary side of the transformer 122 is coupled to the collector of the switch transistor 124. The emitter of the switch transistor 124 is coupled to the adaptive ON-time circuitry 130.

The polarity orientation of the primary and secondary windings are preferably arranged so that the respective windings have opposite polarity. As illustrated in FIG. 1, polarity indicators 112 and 114 show that the polarity of the primary and secondary windings are opposite. This opposite polarity is useful for implementing a flyback circuit topology.

The adaptive ON-time circuitry 130 includes a first switch resistor 131, which is coupled to the emitter of the switch transistor 124 to form an ON-time node 134. The ON-time circuitry 130 also includes an ON-time comparator 132. The ON-time comparator 132 is coupled to receive voltage signals from the ON-time node 134 and ON-time reference voltage $V_{REF1}$ 133.

The adaptive OFF-time circuitry 135 includes a second switch resistor 136, which is coupled to the secondary winding of the transformer 122 and to non-inverting terminal of the OFF-time comparator 137. The OFF-time comparator 137 also receives an OFF-time reference voltage $-V_{REF2}$ 138. The OFF-time reference voltage $-V_{REF2}$ 138 is negative because it is compared to the negative voltage across the second switch resistor 136.

The adaptive ON-time circuitry 130 and adaptive OFF-time circuitry 135 each provides output signals that are received by a latch 126. The Latch 126 is, for example, a set/reset latch. In particular, the reset portion of the latch 126 is coupled to receive the output of the ON-time circuitry 130 and the set portion of the latch 126 is coupled to receive the output of the OFF-time circuitry 135. If the latch 126 receives signals simultaneously for both set and reset, the reset input preferably takes priority. The Latch 126 provides a latch output to the base of the switch transistor 124 based on the output signals provided by the ON-time circuitry 130 and OFF-time circuitry 135. The latch output is toggled to activate or de-activate the switch transistor 124 to generate the switching action necessary for DC-to-DC conversion.

When the recharge of the photoflash, immediately after a flash, is complete, another recharge occurs if the voltage on the photoflash capacitor 144 decreases below the reference voltage $V_{REF2}$ 138 due to current leakage. This keeps the photoflash sufficiently charged until next use. However, such a recharge is not necessary in all operating situations. Where the photoflash is rarely needed, such as outdoors on a sunny day, consideration of power is more important than photoflash charging at all times. Accordingly, in this situation, the reference voltage $V_{REF2}$ 138 should be set lower to reduce the frequency of recharge. On the contrary, in a situation where the photoflash is used more, such as at night, the reference voltage $V_{REF2}$ 138 must be high enough to guard against undercharging.

Conventionally, in the previously described circuitry, circuits and elements other than the transformer and photoflash capacitor reside in a single IC. The reference voltage $V_{REF2}$ 138 or $V_{REF1}$ 133 is determined once the IC is fabricated, which allows no flexibility in recharge timing. The fixed recharge timing is disadvantageous to consideration of power.

SUMMARY OF THE INVENTION

The object of the present invention is to provide a method and device for charging a photoflash capacitor utilizing an adjustable threshold voltage for recharge.

The present invention provides a method for charge control of a photoflash capacitor. The method includes detecting a voltage on the photoflash capacitor, asserting and then latching a recharge signal when the detected voltage is lower than a first reference voltage, de-asserting and then latching the recharge signal when the detected voltage exceeds a second reference voltage, charging the photoflash capacitor when the recharge signal is asserted, and providing a pin for connection of a resistive element which determines the first reference voltage.

The present invention further provides a photoflash capacitor charger operating in conjunction with a microprocessor. The photoflash capacitor charger includes a transformer receiving a primary input voltage to induce a secondary output voltage on the photoflash capacitor when a recharge signal is asserted, and a recharge controller detecting a voltage on the photoflash capacitor, asserting and then latching the recharge signal when the detected voltage is lower than a first reference voltage, and de-asserting and then latching the recharge signal when the detected voltage exceeds a second reference voltage, wherein the first reference voltage is determined by the microprocessor.

The present invention also provides an integrated circuit for recharge control of a photoflash capacitor. The integrated circuit includes first, second, third and fourth pins respectively for reception of a ground voltage, primary input voltage, detected voltage from the photoflash capacitor and connection with a resistive element, a first comparator circuit including a first comparator having a positive and negative input respectively connected to the fourth and third pin, and a resistor connected between the second and fourth pin, a second comparator circuit including a voltage divider connected between the first and second pin, and a second comparator having a positive and negative input respectively connected to the third pin and an output of the voltage divider, and a latch including a first and second inverter wherein an input and output of the first inverter are respectively connected to an output and input of the second inverter, a third inverter having an input connected to the output of the second inverter and an output for a recharge signal, a first switch connected between the input of the first inverter and the first pin, and a second switch connected between the input of the second inverter and the first pin.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
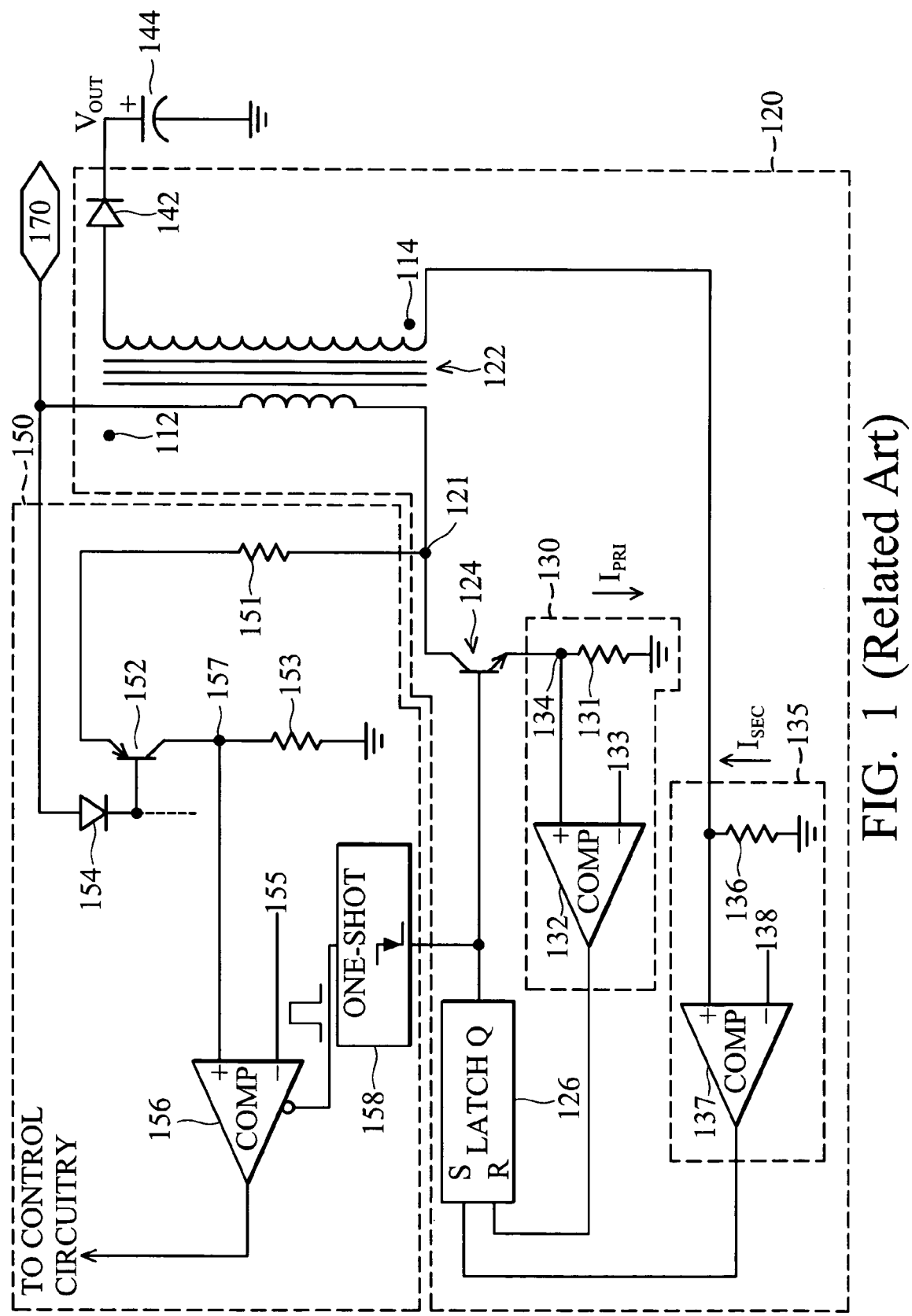
FIG. 1 is a circuit diagram of a photoflash capacitor charging circuit disclosed in U.S. Pat. No. 6,518,733.
Figure 2A:
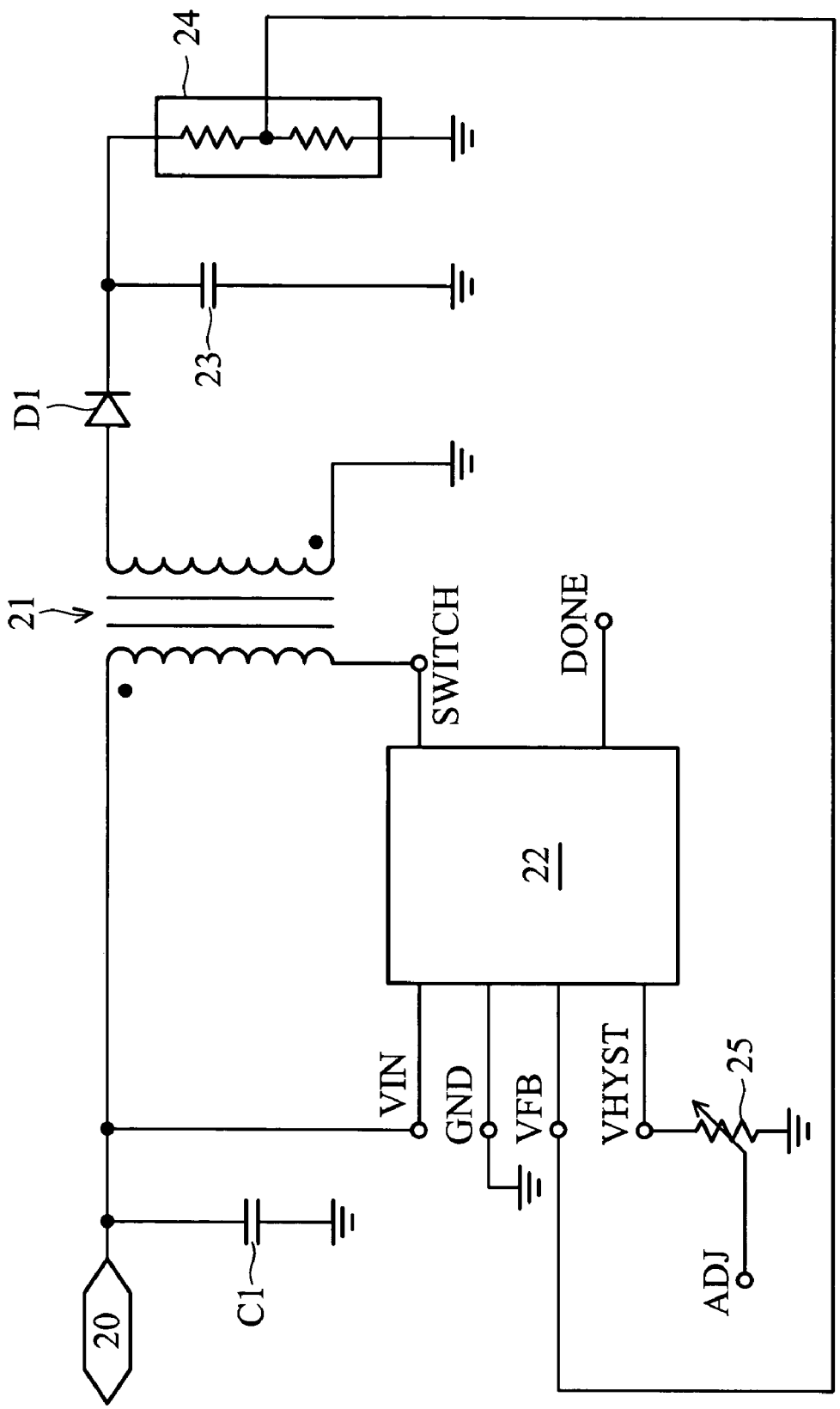
FIGS. 2A and 2B are circuit diagrams of a photoflash capacitor charger according to one embodiment of the invention.

FIG. 2A is a circuit diagram of a photoflash capacitor charger according to one embodiment of the invention. The photoflash capacitor charger operates in conjunction with a microprocessor (not shown) in a digital camera and includes a capacitor C1, a step-up transformer 21, a integrated circuit of recharge controller 22, an ultra-fast diode D1, a photoflash capacitor 23, a voltage divider 24 and a variable resistor 25. The step-up transformer 21 has one end of its primary winding coupled to receive a primary input voltage from an input source 20. The other end of the primary winding is coupled to a pin SWITCH of the IC 22 so that a secondary output voltage is induced on the photoflash capacitor 23 only when the IC 22 couples the pin SWITCH to ground. The pin SWITCH is coupled to ground when an internal recharge signal L-set (not shown in FIG. 2A and described later) of the IC 22 is asserted.

The IC 22 has at least six pins VIN, GND, VFB, VHYST, SWITCH and DONE respectively for reception of the primary input voltage from the input source 20, a ground voltage and an output voltage from the voltage divider 24 detecting the voltage on the photoflash capacitor, and connection with a resistive element 25 and the primary winding of the step-up transformer 21, and output of a status signal DONE to the microprocessor. The IC (recharge controller) 22 receives the output voltage VFB from the voltage divider 24, asserts and then latches the recharge signal L-set when the voltage VFB is lower than a reference voltage VHYST, and de-asserts and then latches the recharge signal L-set when the voltage VFB exceeds another reference voltage VBG. The reference voltage VHYST is determined by the resistance 25 which can be adjusted by a signal ADJ from the microprocessor. Details of the IC 22 are described in the following with reference to FIG. 2B.

Figure 2B:
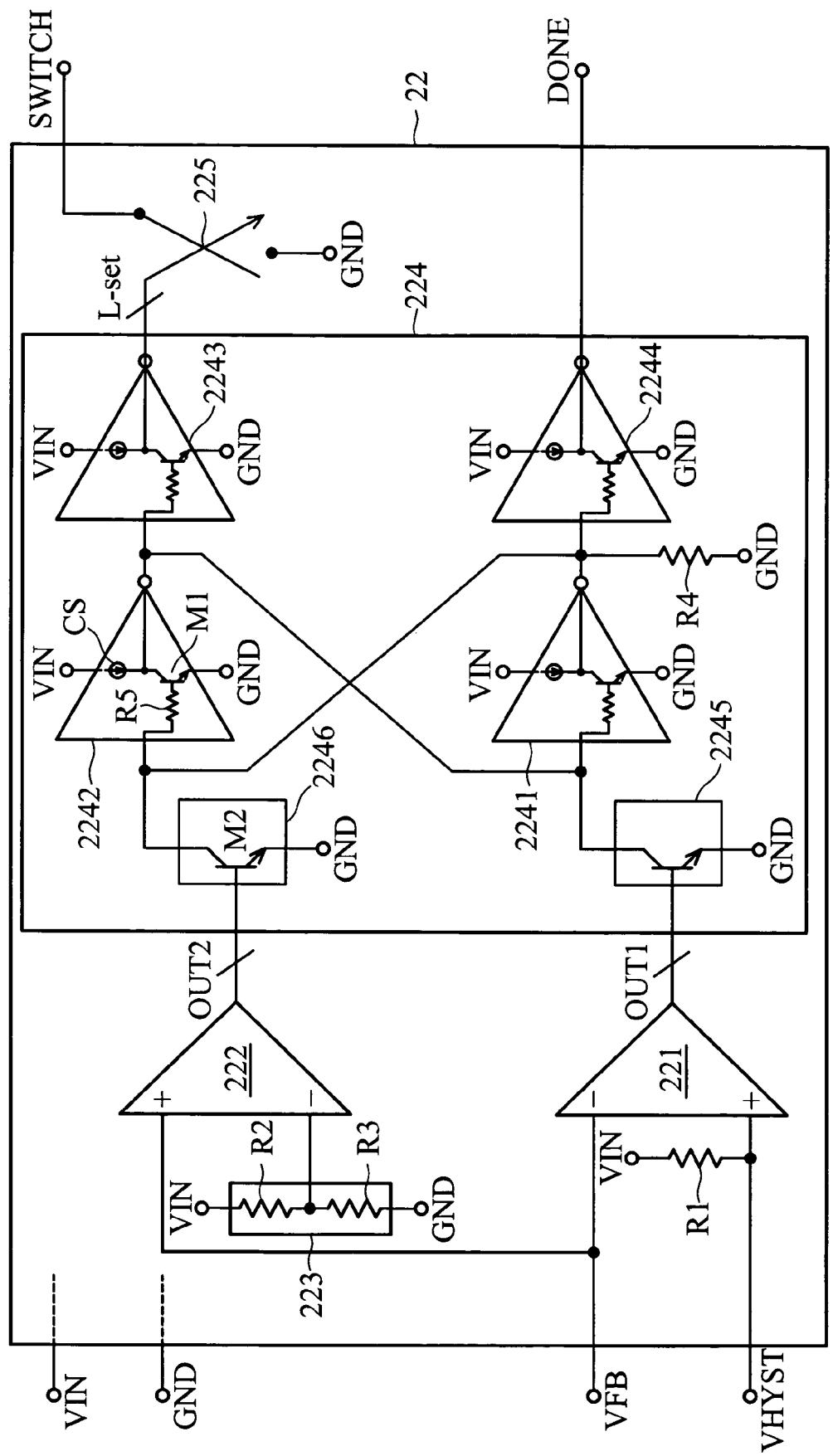

As shown in FIG. 2B, the IC 22 includes a first comparator circuitry comprising a comparator 221 and a resistor R1, a second comparator circuitry comprising a comparator 222 and voltage divider 223, a latch 224, and a current switch 225.

The comparator 222 comprises a positive and negative input respectively connected to the pins VHYST and VFB. The resistor R1 is connected between the pins VIN and VHYST. The voltage divider 223 comprises two resistors R2 and R3 connected in series and is connected between the pins VIN and GND. The comparator 222 comprises a positive and negative input respectively connected to the pin VFB and an output of the voltage divider 223.

The latch 224 includes inverters 2241~2244, switches 2245 and 2246, and a resistor R4. The input and output of the inverter 2241 are respectively connected to the output and input of the inverter 2242. The inverter 2243 has an input connected to the output of the inverter 2242 and outputs the recharge signal L-set. The inverter 2244 has an input connected to the output of the inverter 2241 and outputs the status signal DONE. The resistor R4 is connected between the output of the inverter 2241 and the pin GND. The switch 2245 is connected between the input of the inverter 2241 and the pin GND. The switch 2246 is connected between the input of the inverter 2242 and the pin GND. The current switch 225 is controlled by the recharge signal L-set from the inverter 2243 and connected between the pins SWITCH and GND. The current switch 225 is closed and opened when the recharge signal L-set is asserted and de-asserted.

As is known, each inverter 2241~2244 may include a transistor M1 having a collector as the output and an emitter connected to the pin GND, a current source CS connected to the collector of the transistor M1, and a resistor R5 having one end as the input and the other end connected to a base of the transistor M1. Each of the switches 2245 and 2246 may be a transistor M2. The operation of the IC 22 will be described in the following with reference to FIG. 3.

The resistor R1 and the externally connected resistor 25 form a voltage divider. The voltage divider receives the primary input voltage and outputs the reference voltage VHYST divided therefrom. The comparator 221 asserts (pulls up) and de-asserts (pulls down) the output signal OUT1 respectively when the detected voltage VFB is lower and higher than the reference voltage VHYST during periods A and E. The comparator 222 asserts (pulls up) and de-asserts (pulls down) the output signal OUT2 respectively when the detected voltage VFB is higher and lower than the reference voltage VBG during a period C. During a period B, the latch 224 asserts (pulls down) the recharge signal L-set when the signal OUT1 is asserted (pulled up), until the signal out 2 is asserted (pulled up). During a period D, the latch 224 de-asserts (pulls high) the recharge signal L-set when the output signal OUT2 is asserted, until the output signal OUT1 is asserted.

Figure 3:
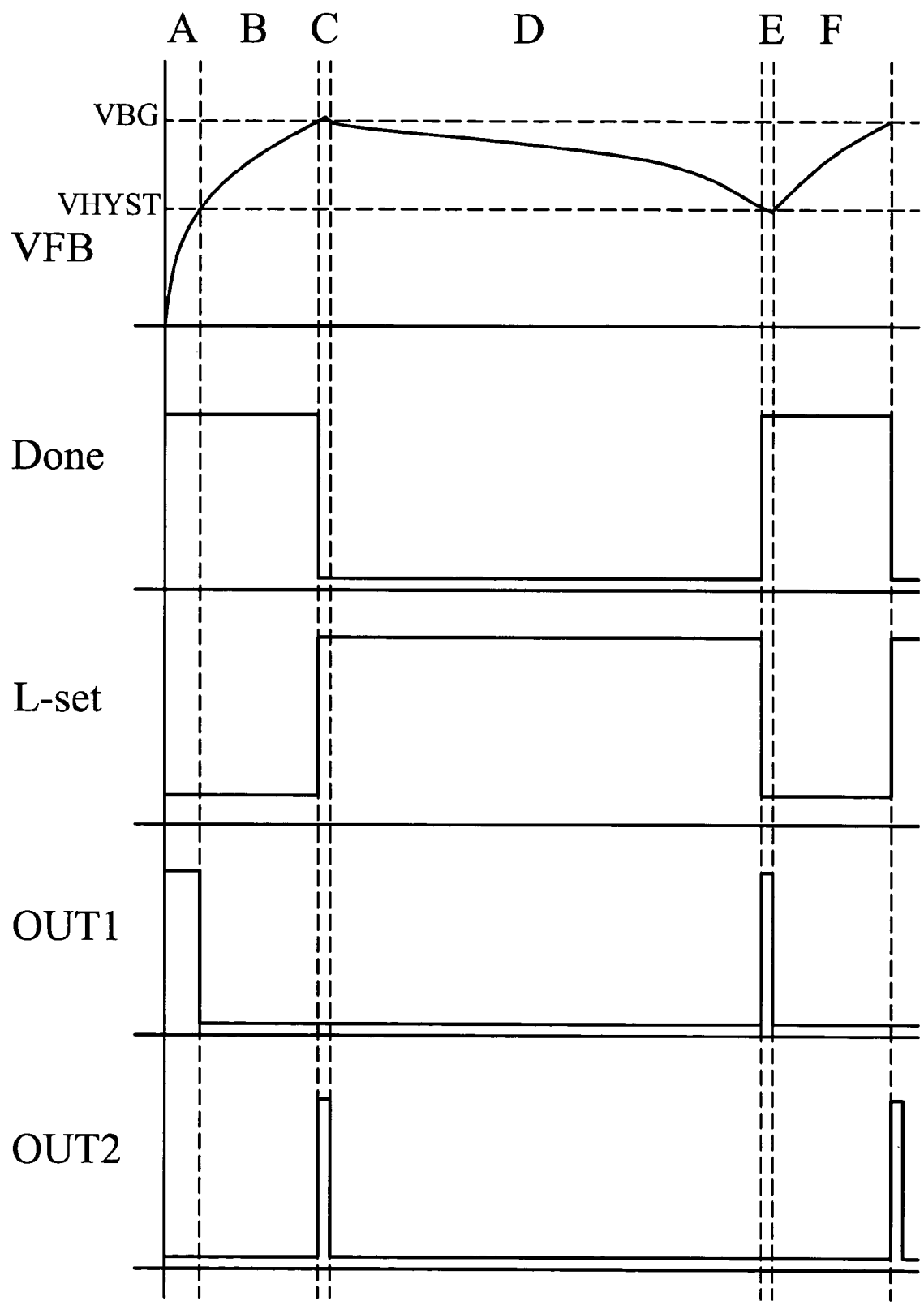
FIG. 3 shows timing of the signals used in the photoflash capacitor charger of FIG. 2B.

In FIG. 3, it is noted that the voltage VFB raises from a lowest level (near to 0) to VBG during the periods A and B. This happens immediately after a flash is produced. The photoflash capacitor 23 is fully charged in the period C.

Then, the voltage VFB decreases due to current leakage of the photoflash capacitor 23 during the period D. Once the voltage VFB decreases below the voltage VHYST, which happens during the period E, the photoflash capacitor 23 is recharged and the voltage VFB begins to increase in the period E. Since the IC 22 has the pin VHYST for external connection with a resistive element 25, photoflash or camera system designers can easily adapt the reference voltage VHYST to a desired value. Even more, the externally connected resistor 25 may be a variable resistor with a resistance controlled by the signal ADJ from the microprocessor of the camera, as shown in FIG. 2A. Thus, when the photoflash is rarely needed, the reference voltage VHYST may be set lower manually by the user or automatically by the microprocessor to reduce frequency of recharge, which significantly reduces power consumption.

Figure 4:
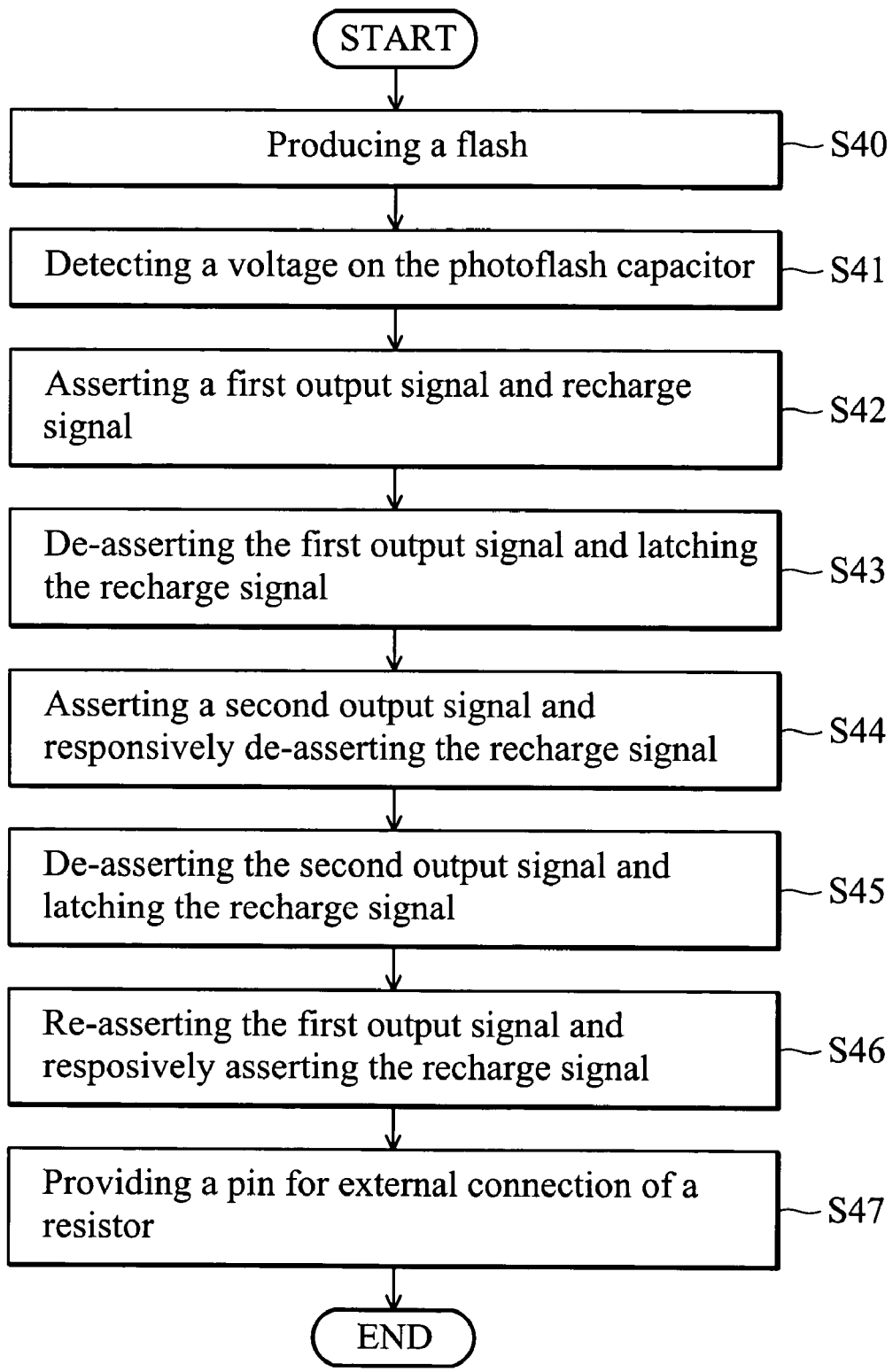
FIG. 4 is a flowchart of a method for charging a photoflash capacitor according to one embodiment of the invention.

FIG. 4 is a flowchart of a method for charging a photoflash capacitor according to one embodiment of the invention.

In step S40, a flash is produced by discharging a photoflash capacitor through an ionized flash tube.

In step S41, a voltage on the photoflash capacitor is detected.

In step S42, a first output signal is asserted due to the detected voltage being lower than a first reference voltage. In response to the asserted first output signal, a recharge signal is asserted so that the photoflash capacitor begins charging and the detected voltage increases.

In step S43, the first output signal is de-asserted when the detected voltage increases above the first reference voltage while the asserted recharge signal is latched so that the detected voltage keeps increasing.

In step S44, a second output signal is asserted when the detected voltage exceeds a second reference voltage. In response to the asserted second output signal, the recharge signal is de-asserted to terminate charging the photoflash capacitor.

In step S45, the detected voltage begins to decrease due to current leakage of the photoflash capacitor. The second output signal is de-asserted when the detected voltage falls below the second reference voltage while the de-asserted recharge signal is latched so that the detected voltage keeps decreasing.

In step S46, the first output signal is re-asserted since the detected voltage decreases below the first reference voltage. In response to the asserted first output signal, the recharge signal is also re-asserted so that the photoflash capacitor begins recharging.

In step S47, a pin for connection with a resistive element is provided. The first reference voltage is adjustable and determined by the connected resistive element.

In conclusion, the present invention provides a method and device for charging a photoflash capacitor utilizing an adjustable threshold voltage for recharge. The circuitry for recharge control is designed so that the recharge control IC has a pin for external connection with a resistive element determining the threshold voltage for recharge. Thus, photoflash or camera system designers can easily adapt the threshold voltage to a desired value and even more, the threshold voltage may be set manually by the user or automatically by the microprocessor for maximum power conservation.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for charge control of a photoflash capacitor comprising the steps of:
   detecting a voltage on the photoflash capacitor;
   asserting and then latching a recharge signal when the detected voltage is lower than a first reference voltage;
   de-asserting and then latching the recharge signal when the detected voltage is higher than a second reference voltage;
   asserting and de-asserting a first output signal respectively when the detected voltage is lower and higher than the first reference voltage;
   asserting and de-asserting a second output signal respectively when the detected voltage is higher and lower than the second reference voltage;
   asserting the recharge signal when the first output signal is asserted, until the second output signal is asserted;
   de-asserting the recharge signal when the first output signal is asserted, until the first output signal is asserted;
   charging the photoflash capacitor when the recharge signal is asserted; and
   providing a pin for connection of a resistive element which determines the first reference voltage.

2. A photoflash capacitor charger operating in conjunction with a microprocessor, comprising:
   a transformer receiving a primary input voltage to induce a secondary output voltage on a photoflash capacitor when a recharge signal is asserted;
   a recharge controller detecting a voltage on the photoflash capacitor, asserting and then latching the recharge signal when the detected voltage is lower than a first reference voltage, and de-asserting and then latching the recharge signal when the detected voltage is higher than a second reference voltage;
   a first comparator circuit asserting and de-asserting a first output signal respectively when the detected voltage is lower and higher than the first reference voltage;
   a second comparator circuit asserting and de-asserting a second output signal respectively when the detected voltage is higher and lower than the second reference voltage; and
   a latch asserting the recharge signal when the first output signal is asserted, until the second output signal is asserted, and de-asserting the recharge signal when the second output signal is asserted, until the first output signal is asserted;
   wherein the first reference voltage is determined by the microprocessor.

3. The photoflash capacitor charger as claimed in claim 2 wherein the first comparator circuit comprises:
   a voltage divider having a first and second resistor connected in series, and receiving the primary input voltage and generating the first reference voltage divided therefrom; and
   a comparator having a positive input receiving the first reference voltage and a negative input receiving the detected voltage, and outputting the first output signal;
   wherein one of the first and second resistor is adjustable.

4. The photoflash capacitor charger as claimed in claim 2 wherein the second comparator circuit comprises:
- a voltage divider having a first and second resistor connected in series, and receiving the primary input voltage and generating the second reference voltage divided therefrom; and
- a comparator having a positive input receiving the detected voltage and a negative input receiving the second reference voltage, and outputting the second output signal.

5. The photoflash capacitor charger as claimed in claim 2 wherein the latch comprises:
- a first and second inverter wherein an input and output of the first inverter are respectively coupled to an output and input of the second inverter;
- a third inverter having an input coupled to the output of the second inverter and outputting the recharge signal;
- a first switch coupled between the input of the first inverter and the ground, and closed and opened respectively when the first recharge signal is asserted and de-asserted; and
- a second switch coupled between the input of the second inverter and the ground, and closed and opened respectively when the second output signal is asserted and de-asserted.

6. The photoflash capacitor charger as claimed in claim 5, wherein each of the first, second and third inverter comprises:
- a transistor having a collector as the output and an emitter coupled to the ground;
- a current source coupled to the collector of the transistor; and
- a resistor having one end as the input and the other end coupled to a base of the transistor.

7. The photoflash capacitor charger as claimed in claim 5, wherein each of the first and second switch is a transistor.

8. The photoflash capacitor charger as claimed in claim 2 further comprising a voltage divider coupled with the photoflash capacitor in parallel, having a first and second resistor connected in series, and generating the detected voltage divided from a voltage difference across the photoflash capacitor.

9. An integrated circuit for recharge control of a photoflash capacitor, comprising:
- first, second, third and fourth pins respectively for reception of a ground voltage, primary input voltage, detected voltage from the photoflash capacitor and connection with a resistive element;
- a first comparator circuit comprising:
  - a first comparator having a positive and negative input respectively connected to the fourth and third pin; and
  - a resistor connected between the second and fourth pin;
- a second comparator circuit comprising:
  - a voltage divider connected between the first and second pins; and
- a second comparator having a positive and negative input respectively connected to the third pin and an output of the voltage divider; and
- a latch comprising:
  - a first and second inverter wherein an input and output of the first inverter are respectively connected to an output and input of the second inverter;
  - a third inverter having an input connected to the output of the second inverter and an output for a recharge signal;
  - a first switch connected between the input of the first inverter and the first pin; and
  - a second switch connected between the input of the second inverter and the first pin.

10. The integrated circuit as claimed in claim 9, wherein each of the first, second and third inverters comprises:
- a transistor having a collector as the output and an emitter connected to the first pin;
- a current source connected to the collector of the transistor; and
- a resistor having one end as the input and the other end connected to a base of the transistor.

11. The integrated circuit as claimed in claim 9, wherein each of the first and second switch is a transistor.

12. The integrated circuit as claimed in claim 9 further comprising:
- a fifth pin for connection with a primary winding of a transformer; and
- a current switch controlled by the recharge signal from the third inverter and connected between the fifth and first pins.

* * * * *